United States Patent [19]

Steenge et al.

[11] Patent Number: 4,664,889
[45] Date of Patent: May 12, 1987

[54] APPARATUS FOR SEPARATING HYDROCARBON PRODUCTS FROM CATALYST PARTICLES

[75] Inventors: Wiecher D. E. Steenge; Ringnerus P. van der Werf; Jan Haringa, all of Amsterdam, Netherlands

[73] Assignee: Shell Oil Company, Houston, Tex.

[21] Appl. No.: 796,353

[22] Filed: Nov. 8, 1985

[30] Foreign Application Priority Data

Nov. 9, 1984 [GB] United Kingdom ............... 8428349

[51] Int. Cl.⁴ ...................... B01J 21/20; C10G 13/18
[52] U.S. Cl. ..................................... 422/147; 55/426; 422/144
[58] Field of Search ................... 422/144, 145; 55/426

[56] References Cited

U.S. PATENT DOCUMENTS

| | | | |
|---|---|---|---|
| 2,451,619 | 10/1948 | Hengstebeck et al. | 422/144 |
| 2,502,953 | 4/1950 | Jahnig | 422/144 |
| 2,521,195 | 9/1950 | Wheeler | 422/144 |
| 2,541,635 | 2/1951 | Boyer | 422/144 |
| 2,895,906 | 7/1959 | Harper | 422/144 |
| 3,767,566 | 10/1973 | Cartmell | 208/120 |
| 4,176,083 | 11/1979 | McGovern et al. | 422/147 |
| 4,206,174 | 6/1980 | Heffley et al. | 422/144 |
| 4,313,910 | 2/1982 | Dries et al. | 422/147 |

Primary Examiner—Michael S. Marcus
Assistant Examiner—William R. Johnson
Attorney, Agent, or Firm—Kimbley L. Muller

[57] ABSTRACT

In a fluidized catalytic cracking apparatus a mixture of hydrocarbon products and hydrocarbon catalyst particles is removed from a reactor riser (1) and introduced into a cyclone separator (2), wherein in order to strip the catalyst particles, primary steam is injected into the cyclone separator (2), and wherein, for additional stripping the catalyst particles are introduced into a stripper assembly (3) comprising at least two interconnected stripper vessels (4, 5) into which secondary steam is introduced.

7 Claims, 5 Drawing Figures

APPARATUS FOR SEPARATING HYDROCARBON PRODUCTS FROM CATALYST PARTICLES

FIELD OF THE INVENTION

The invention relates to a method for separating hydrocarboon products from catalyst particles in a fluidized catalytic cracking process.

In a fluidized catalytic cracking process a mixture of catalyst particles and a feedstock of hydrocarbon products, such as heavy distillates, is passed through a reactor riser at a temperature in the range of from 500° C. to 600° C. and at a pressure of in the range of from 0.25 MPa to 0.35 MPa. In the reactor riser, part of the feedstock is cracked so as to produce valuable hydrocarbon products of lower molecular weight in the boiling range of gasoline and middle distillate. In addition thereto, the cracking yields hydrocarbon containing by-products in the form of a coke deposit on the catalyst particles and hydrocarbon products which are gaseous at normal pressure and temperature, such as methane. Substantially all hydrocarbon products will be in a vaporized form, and part of the hydrocarbons will be adsorbed by catalyst particles.

The mixture of hydrocarbon products and catalyst particles is removed from the reactor riser and introduced into a cyclone separator in such a manner that a vortex is formed causing a first separation between the catalyst particles and the hydrocarbon products, which hydrocarbon products are allowed to leave the cyclone separator through an outlet for gases.

In order to desorb part of the adsorbed hydrocarbon products, primary steam is introduced into the cyclone separator, and the desorbed hydrocarbon products and the steam are allowed to leave the cyclone separator through the outlet for gases.

For further stripping the catalyst particles are allowed to drop into a vessel wherein secondary steam is introduced so as to produce a fluidized bed of catalyst particles. Under influence of the gravity, the catalyst particles are allowed to drop through the bed into the outlet of the vessel.

During stripping of the catalyst particles cracking of the hydrocarbon products will continue and subsequently an additional amount of coke will be deposited on the catalyst particles.

From this vessel the catalyst particles, containing a deposit of coke, are passed to a regenerator unit, in which unit part of the coke is burnt off so as to reactivate the catalyst particles. The reactivated and heated catalyst particles are passed into the lower end of the reactor riser where they are mixed with the feedstock of hydrocarbon products.

BACKGROUND OF THE INVENTION

An apparatus to improve the separation of the gasiform phase from the catalyst phase was the subject of U.S. Pat. No. 4,043,899. Catalyst separated from the gasiform is collected by a helical baffle wherein tangential contact with steam is provided to disentrain hydrocarbon product. Vortexing of the centrifugally stripped catalyst in the cyclone is impeded by a vortex breaker situated in the lower catalyst collecting section. In this manner the separated catalyst particles must contact the stripping gas and are thereafter passed to second holding area. Baffles in the stripping section provide a unitary stripping area which has access to another stripping gas.

OBJECTS AND EMBODIMENTS

It is the object of the invention to provide an improved method and apparatus for separating hydrocarbon products from catalyst particles so as to reduce the production of coke deposited on the catalyst particles during stripping.

To this end the method for separating hydrocarbon products from hydrocarbon catalyst particles comprises withdrawing said hydrocarbon products and said hydrocarbon catalyst particles from a riser reactor, passing said removed products and particles into a cyclone separator having a vortex stabilizer therein, establishing a vortex in said cyclone separator to substantially separate said hydrocarbon products from said hydrocarbon catalyst particles; passing said hydrocarbon products through a cyclone separator products outlet and thereby removing said hydrocarbon catalyst particles through a cyclone separator; passing said hydrocarbon catalyst particles through a cyclone separator catalyst outlet; said cyclone separator being possessed with a means for an inlet of a primary stripping gas; contacting said hydrocarbon catalyst particles with said primary stripping gas; passing said hydrocarbon catalyst particles after said primary stripping gas contact to a first of at least two horizontal stripping zones of fluidized catalyst, wherein the residence quantity of said fluidized hydrocarbon catalyst particles in said stripping beds diminishes such that the first of said stripping zones has the greatest residence time of fluidized hydrocarbon catalyst particles, the next stripping zone has a less residence time for said fluidized hydrocarbon catalyst particles and the last of said stripping zones has the shortest residence time of said fluidized hydrocarbon catalyst particles and wherein at least one of stripping zones is possessed with a source of secondary stripping gas to contact said hydrocarbon particles with said secondary stripping gas wherein said stripped catalyst particles are passed to an interconnecting regeneration zone wherein said catalyst particles are regenerated in the presence of an oxygen-containing gas and passed to said reactor riser.

Another embodiment of this invention comprises a process wherein the horizontal stripping zone is designed with applicable bafflers so that the hydrocarbon catalyst residence time ranges from 50 secs to not more than 500 secs.

DETAILED DESCRIPTION OF THE INVENTION

Since the residence time of the catalyst particles in the stripper assembly is larger than a predetermined minimum residence time, the residence time of the catalyst particles in the cyclone separator can be very short. An advantage of this short residence time is that further cracking of valuable lower molecular weight hydrocarbon products to undesired by-products such as coke deposition and methane is prevented.

A further advantage is that, since the amount of hydrocarbons on the catalyst particle is reduced, the catalyst particles contain less hydrogen so that more carbon can be burnt off in the regenerator unit without raising the temperature of the catalyst particle above an undesired high level. Consequently an additional amount of carbon can be removed from the regenerated catalyst particles and this has a further favorable influence on the amount of hydrocarbons that can be converted per unit mass of catalyst particles and on the conversion of the feedstock of heavy hydrocarbon products.

A suitable predetermined minimum residence time in the stripper section is in the range of from 50 sec to 500 sec.

In an embodiment of the invention the mixture of hydrocarbon products and catalyst is introduced into the upper end of the cyclone separator.

In order to prevent excessive wear of the wall of the cyclone separator the method further comprises centering the top of the vortex by contact with a vortex stabilizer, which is coaxially located near the lower end of the cyclone separator.

In order to improve separation of hydrocarbon products and catalyst particles, primary stripping gas is introduced into the cyclone separator near its upper end, in the annular space between the walls of the cyclone separator and the outlet.

In order to further improve separation of hydrocarbon products and catalyst particles and to minimize over cracking and coke formation, primary stripping gas is introduced into the cyclone separator in the annular space between the wall of the cyclone separator and the vortex stabilizer.

A suitable gas for primary and secondary stripping is steam. In order to reduce the amount of hydrogen present in the form of steam at or near the catalyst particles, a substantially inert gas, such as flue gas or nitrogen, can be introduced in at least the last stripper vessel.

The invention further relates to an apparatus for separating hydrocarbon products from catalyst particles comprising a cyclone separator, an inlet for introducing into the cyclone separator a mixture of catalyst particles and hydrocarbon products, an outlet for removing gases from the cyclone separator which outlet is so arranged near the upper end of the cyclone separator that an annular space is formed between the walls of the outlet and the cyclone separator, and a stripper assembly having an outlet and comprising at least two interconnecting horizontal stripper zones, the first of which is in fluid communication with the lower end of the cyclone separator and the last of which is provided with an outlet for catalyst particles, wherein the cyclone separator is provided with means for introducing primary stripping gas into the cyclone separator, and wherein the stripper assembly is provided with means for introducing secondary stripping gas into the stripper zones.

In the specification and in the claims the word gas is used to refer to gas, vapor or a mixture of gas and vapor.

BRIEF DESCRIPTION OF THE DRAWING

The invention will now be described by way of example in more detail with reference to the drawings, wherein.

DETAILED DESCRIPTION OF THE INVENTION

Figure 1:
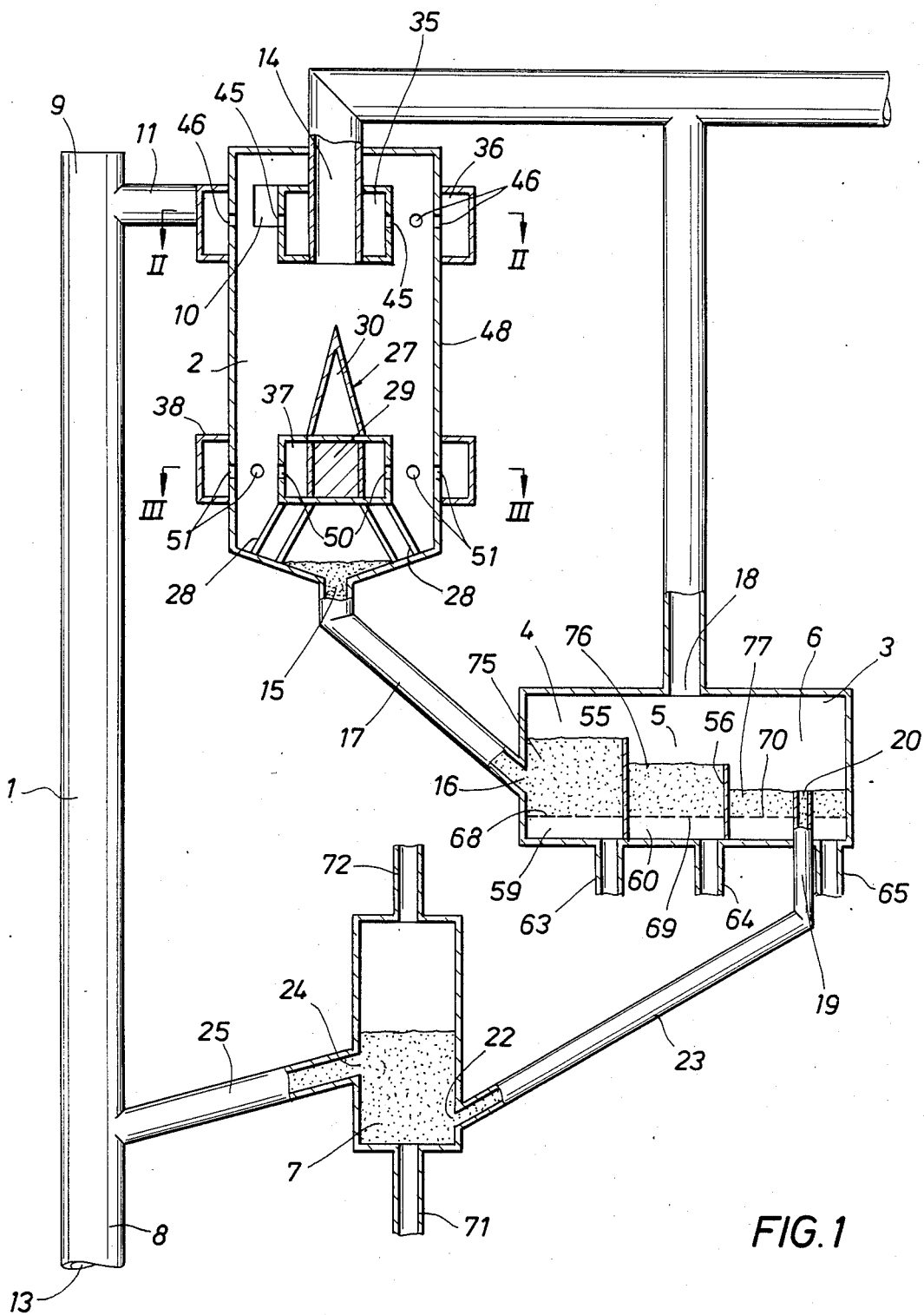
FIG. 1 shows schematically an apparatus for carrying out the fluidized catalytic cracking process.
Figure 2:
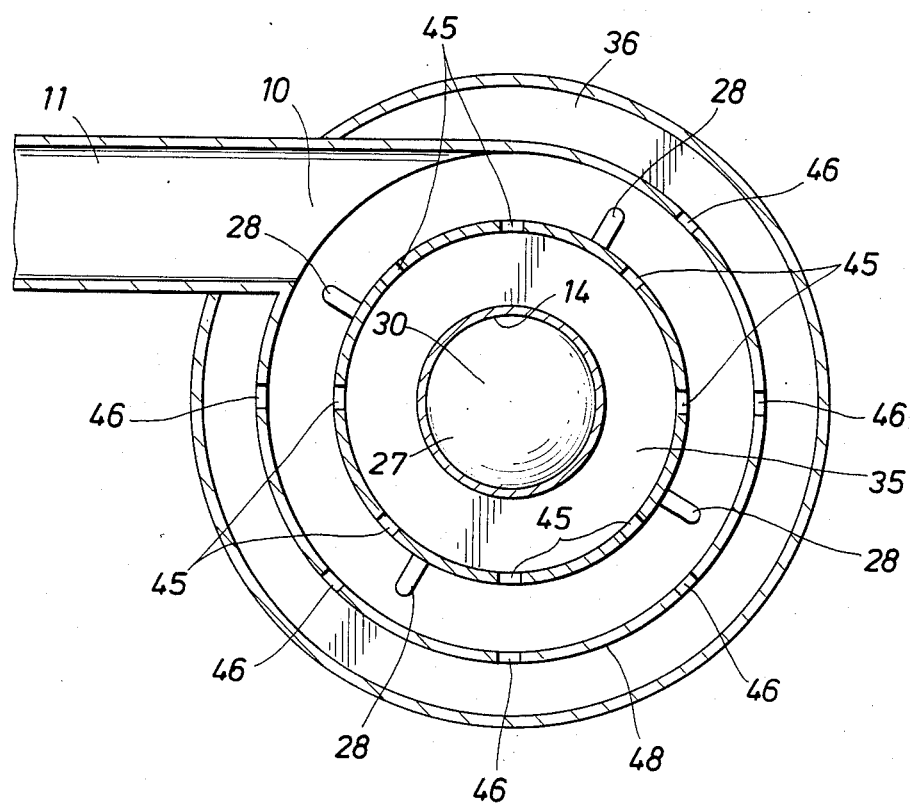
FIG. 2 shows schematically a cross-section of FIG. 1 along the line II—II drawn to a scale larger than the scale of FIG. 1.
Figure 3:
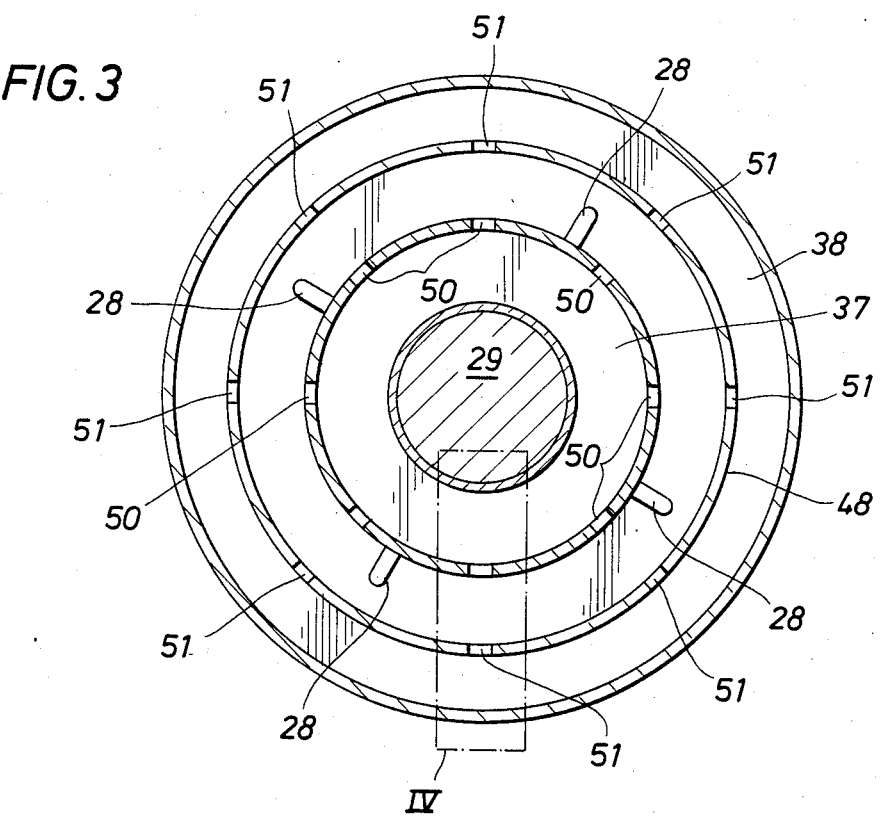
FIG. 3 shows schematically a cross-section of FIG. 1 along the line III—III drawn to a scale larger than the scale of FIG. 1.

Reference is now made to FIGS. 1 to 3. The apparatus comprises a reactor riser 1, a cyclone separator 2, a stripper assembly 3 comprising three interconnected stripper zones 4, 5 and 6, and a regenerator unit 7. The reactor riser 1 has an inlet section 8 and an outlet section 9 which is connected to a tangential inlet opening 10 of the cyclone separator 2 by means of a conduit 11. The cyclone separator 2 has an outlet 14 for gases and an outlet 15 for catalyst particles which is connected to the inlet 16 of the first stripper zone 4 by means of conduit 17. The stripper assembly 3 is provided with an outlet 18 for gases and an outlet 19 for catalyst particles. The outlet 19 is provided with an inlet section 20 and is connected to inlet 22 of the regenerator unit 7 by means of conduit 23. Outlet 24 of the regenerator unit 7 is connected to the inlet section 8 of the reactor riser 1 by means of conduit 25.

The cyclone separator 2 further comprises a vortex stabilizer 27 which is supported by means of supports 28 and which comprises a solid plate or disk 29 and a vortex finder rod 30.

Moreover, the cyclone separator 2 comprises means for introducing primary stripping gas into the cyclone separator 2. These means comprise four annular stripping gas distributor spaces 35, 36, 37 and 38; two of which, 35 and 36, are arranged near the upper end of the cyclone separator 2, and the other two, 37 and 38, are arranged near the vortex stabilizer 27.

The annular stripping gas distributor spaces 35 and 36 are connected to means (not shown) for supplying primary stripping gas, and they are provided with outlet openings 45 and 46 respectively, which outlet openings are arranged in the annular space between the outlet for gases 14 and the wall 48 of the cyclone separator 2. The annular stripping gas distributor spaces 37 and 38 are connected to means (not shown) for supplying primary stripping gas, and they are provided with outlet openings 50 and 51, respectively, which outlet openings are arranged in the annular space between the vortex stabilizer 27 and the wall 48 of the cyclone separator 2.

The stripper assembly comprising horizontal stripping zones 4, 5 and 6 are separated from each other by means of partitions or baffles 55 and 56, wherein the height of the partition 55 is taller than the height of the next partition 56. Moreover, the stripper zones 4, 5 and 6 are provided with secondary stripping gas distribution spaces 59, 60 and 61, which distributor spaces are connected by means of conduits 63, 64 and 65 to means (not shown) for supplying secondary stripping gas and provided with permeable plates 68, 69 and 70 allowing stripping gas to enter the stripper vessel 4, 5 and 6.

In the regenerator unit 7 coke deposited on the catalyst particles is burnt off with the use of air supplied to the regenerator unit 7 by means of an airblower (not shown) via conduit 71, wherein combustion products are allowed to leave through exhaust conduit 72.

The operation of the apparatus will now be described. In a continuous process heavy distillate feedstock and if required steam is introduced into the lower end of the inlet section 8 of the reactor riser 1, and catalyst particles are introduced into the inlet section 8 via conduit 25. In the reactor riser 1, at a temperature in the range of from 500°–600° C. and at a pressure in the range of from 0.25–0.35 MPa, the heavy distillate feedstock is cracked to produce compounds of lower molecular weight in the boiling range of gasoline and middle distillate. In addition thereto the conversion yields a coke deposit on the catalyst particles and hydrocarbon products which are gaseous at normal pressure and temperature, such as methane.

At an outlet section 9 of the reactor riser 1 the mixture of hydrocarbon products and catalyst particles is removed from the reactor riser 1. The mixture is passed through conduit 11 and is introduced into the cyclone separator 2 through the tangential inlet opening 10 so that a vortex is formed in the cyclone separator 2. The vortex causes a first separation between the catalyst particles and the hydrocarbon products. The separated hydrocarbon products leave the cyclone separator 2 through the outlet 14 for gases.

Simultaneously with introducing the mixture of catalyst particles and hydrocarbons into the cyclone separator 2, stripper gas in the form of steam is supplied to the annular stripping gas distributor spaces 35, 36, 37 and 38. The steam, passing through the outlet openings 45, 46, 50 and 51, contacts the catalyst particles intensively so as to initiate desorption of the hydrocarbons which are adsorbed by the catalyst particles. Furthermore, the steam will stimulate separation of hydrocarbon products from catalyst particles so as to reduce conversion of valuable products, such as middle distillates, into less valuable products, such as methane. In order to further reduce this undesired conversion and to reduce overcracking, the residence time of the catalyst particles in the cyclone separator 2 should be short, for example in the range of from 2 sec to 100 sec.

At the lower end of the cyclone separator 2, near the outlet 15 for catalyst particles the catalyst particles are held up before leaving the cyclone separator 2.

The catalyst particles leaving the cyclone separator 2 still carry adsorbed hydrocarbons and the decomposition of these hydrocarbons into compounds of lower molecular weight and into coke will continue with time. In order to allow removal of the converted compounds of the adorbed hydrocarbons, the catalyst particles are introduced into the first horizontal stripper zone 4 of stripper assembly 3.

The stripper assembly 3 comprises three stripper zones 4, 5 and 6, which can be individual horizontal stripping vessels, and into which secondary stripping gas is introduced to maintain fluidized beds 75, 76 and 77 of catalyst particles in the horizontal stripper zones 4, 5 and 6.

The flow of catalyst particles in fluidized bed 75 in the first horizontal stripper zone 4 is such that catalyst particles in the bed near the inlet opening 16 pass downwardly; thus these catalyst particles cannot move along a straight line to the top of the partition 55. A similar phenomenon occurs in the fluidized bed 76 in the second horizontal stripper zone 5, wherein catalyst particles having passed the partition 55 pass downwardly so as to prevent that these particles will pass along the shortest path to the top of partition 56, and in the fluidized bed 77 a similar phenomenon prevents catalyst particles from moving directly to the outlet 19 of the stripper assembly 3. Thus the catalyst particles are forced to stay in the stripper assembly 3 at least during a predetermined minimum residence time. The residence time is equal to a time of from 50 to 500 seconds. In stripper assembly 3 further desorption of adsorbed hydrocarbons and removal of the hydrocarbon products from the catalyst particles will occur via the entry of the secondary stripping gas.

The flow of catalyst particles in each of the fluidized beds 75, 76 and 77 can be obtained by introducing less secondary stripping gas per unit of time into the part of the fluidized bed where the catalyst particles enter the fluidized bed than in the remaining part thereof.

After a predetermined minimum residence time the catalyst particles are removed from the stripper assembly 3, and they are introduced into regenerator unit 7 in which the coke deposited on the catalyst particles is burnt off with the use of air supplied via conduit 71, wherein combustion products are allowed to leave the regenerated unit 7 via the exhaust conduit 72. The regenerated and heated catalyst particles are introduced into the reactor riser 1 through conduit 25, and if required, fresh catalyst can be added to the regenerated catalyst through a conduit (not shown) opening into conduit 25.

The predetermined minimum residence time is so selected that the amounts of carbon and hydrogen are minimized. A suitable minimum residence time in the stripper assembly is in the range of from 50 sec to 500 sec.

Figure 4:
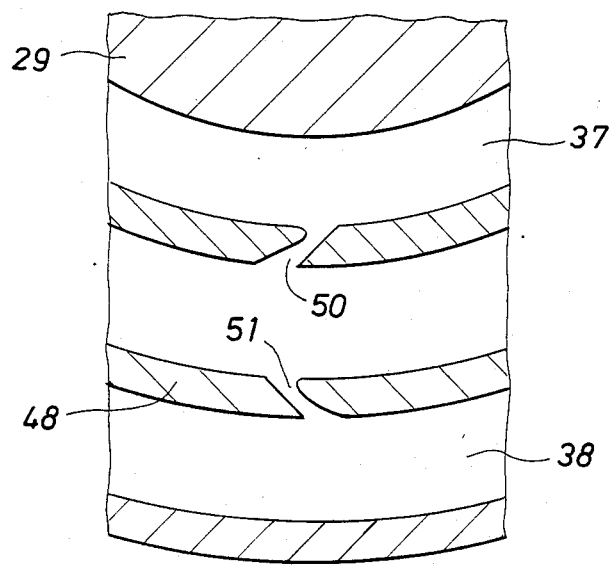
FIG. 4 shows detail IV of FIG. 3 drawn to a scale larger than the scale of FIG. 3.

In a suitable embodiment of the invention the outlet openings 50 and 51 (see FIG. 4) are so arranged that the jets leaving the outlet openings 50 and 51 have substantially the same direction as, during normal operation, the flow of the mixture of hydrocarbon products and catalyst particles in the cyclone separator 2. Moreover, openings 45 and 46 can also be arranged in a similar manner.

If, during normal operation, the amount of catalyst particles held up in the lower end of the cyclone separator 2 is too large, a gas such as steam, may be introduced into the bed of catalyst particles through openings (not shown) near the outlet 15. The introduction of such a gas will result in a more evenly distributed flow of catalyst particles through conduit 17.

In order to reduce the amount of steam carried by the catalyst particles, the catalyst particles can be furthermore stripped with an inert gas, such as nitrogen, introduced into the stripper assembly 3, for example in the last horizontal stripper zone 6 having the smallest content of catalyst particles vis-a-vis all the formal horizontal stripping zones.

Figure 5:
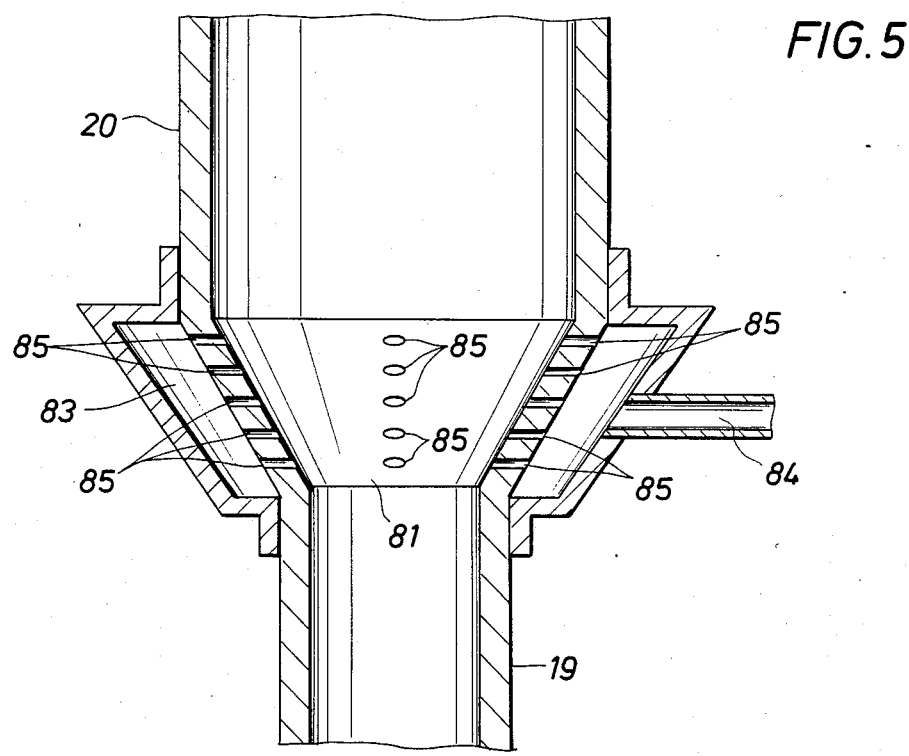
FIG. 5 shows schematically an alternative inlet opening of the outlet for catalyst particles pertaining to the last stripper vessel.

Reference is made to FIG. 5 showing inlet section 20 of the outlet 19 pertaining to stripper assembly 3, provided with a conical throat 81 and an annular chamber 83 surrounding the conical throat 81. The annular chamber 83 is provided with an inlet conduit 84 connected to a supply (not shown) of inert gas or flue gas, which has flows, during normal operation, via the inlet conduit 84 and the annular chamber 83 through a plurality of openings 85 into the throat 81 so as to remove steam from the catalyst particles leaving the last horizontal stripper zone of stripper assembly 3.

The stripper assembly can have a circular cross-section wherein each stripper vessel comprises a circle-sector which is bounded by two partitions.

The partitions can be provided with indentations, moreover, the stripper assembly may comprise more than three stripper zones, for example four, five or six. When there are more than two interconnected stripper zones, separated from each other by partitions, the height of the partition should decrease in the direction toward the stripper outlet wherein during normal operation catalyst particles move traversely through the stripper assembly.

In order to effectively center the vortex of the mixture of hydrocarbon products and catalyst particles in the separator vessel the length of the vortex finder rod should be at least one third of the length of the vortex.

To prevent extremely high pressure in the lower part of the cyclone separator the vortex stabilizer is provided with an axial passage.

What we claim as our invention is:

1. An apparatus for separating hydrocarbon products from hydrocarbon catalyst particles which comprises a cyclone separator and interconnecting stripper assembly as defined by:

(a) said cyclone separator having means defining an upper and a lower portion, exterior walls, an inlet for introducing said hydrocarbon products and said hydrocarbon catalyst particles into said cyclone separator located at said upper portion, an upper outlet in said upper portion of said separator for removing said hydrocarbon products from said cyclone separator, a bottom outlet in said cyclone separator situated in the lower portion of said cyclone separator, said bottom outlet communicating with said stripper assembly, said bottom outlet suitable for passage of separated hydrocarbon catalysts particles therethrough, a vortex stabilizer to cause separation of said hydrocarbon products from said catalyst particles located within said lower portion as to define a first annular region within said cyclone separator, first primary stripping gas inlet means comprising a plurality of orifices arranged in said first annular region which communicated with a source of primary stripping gas to provide flow of said primary stripping gas in a direction concurrent with respect to flow of said hydrocarbon particles passing through said bottom cyclone separator outlet, means defining a second annular region within said upper portion of said cyclone separator and second primary stripping gas inlet means arranged in said second annular region and (b) said stripper assembly comprising an inlet for entry of hydrocarbon catalyst particles from said cyclone separator, a first outlet for removal of gases from said stripper assembly, a second outlet for removal of the catalyst particles, means defining at least two interconnecting horizontal stripping zones, said means comprising a plurality of upright partitions of relatively decreasing heights as said partitions are situated closer to said second outlet to provide that each preceding stripping zone in said stripper assembly bed contains a larger quantity of catalyst particles than contained in a next adjacent stripping zone, wherein the first of said at least two interconnecting horizontal stripping zones communicates with said bottom outlet of said cyclone separator and the last of said at least two stripping zones communicates with a regeneration zone by means of said second outlet, wherein each of said at least two stripping zones includes secondary stripping gas inlet means for introduction of secondary stripping gas into said stripper assembly.

2. The apparatus of claim 1 wherein said catalyst particles have a residence time of from 50 secs to not more than 500 secs in said stripper assembly.

3. The apparatus of claim 1 wherein said vortex stabilizer is centered in said lower portion of said cyclone separator.

4. The apparatus of claim 1 wherein said vortex stabilizer is centered coaxially near the lower end of said cyclone separator to create said vortex to cause separation between said hydrocarbon products and hydrocarbon catalyst particles.

5. The apparatus of claim 1 wherein said secondary stripping gas inlet means communicates with a source of steam.

6. The apparatus of claim 1 wherein primary stripping said secondary stripping gas inlet means communicates with a source of an inert gas.

7. The apparatus of claim 1 wherein said secondary stripping gas inlet means comprises a plurality of annularly situated gas nozzles communicating with said stripping zone.

* * * * *